United States Patent [11] 3,593,498

| [72] | Inventor | Albert L. Semon<br>11 Eliot Place, Short Hills, N.J. 07078 |
|---|---|---|
| [21] | Appl. No. | 792,730 |
| [22] | Filed | Jan. 21, 1969 |
| [45] | Patented | July 20, 1971 |

[54] AIR DRIER AND FILTER
6 Claims, 3 Drawing Figs.

[52] U.S. Cl.................................................... 55/267,
55/316, 55/387, 55/419, 55/482
[51] Int. Cl..................................................... B01d 53/26
[50] Field of Search........................................... 55/316,
269, 387, 419, 482, 267

[56] References Cited
UNITED STATES PATENTS

| 2,557,557 | 6/1951 | Newcum ...................... | 55/387 X |
| 2,984,314 | 5/1961 | Penton .......................... | 55/387 |
| 3,171,726 | 3/1965 | Roney et al. ................. | 55/387 X |
| 3,338,032 | 8/1967 | Stewart ........................ | 55/387 X |

FOREIGN PATENTS

| 560,123 | 3/1944 | Great Britain................ | |

*Primary Examiner*—Tim R. Miles
*Assistant Examiner*—Steven H. Markowitz
*Attorney*—John A. Seifert ABSTRACT: An air drier and filter wherein the air enters through a perforated metal filter in the sidewall and at one end of a casing, said air flowing longitudinally of said casing from the perforated metal filter through an annular mass of a desiccating agent to the opposite end of the casing where it passes laterally through a porous metal filter into an annular passage to flow toward the inlet end of the casing where it flows laterally into a heated chamber leading to a center outlet of the casing.

PATENTED JUL 20 1971  3,593,498

INVENTOR.
A. L. SEMON
BY John A. Seifert
ATTORNEY

AIR DRIER AND FILTER

The drier and filter is formed of three tubes retained in concentric formation by a cap member at one end and a nut at the other end whereby two annular passages and a center passages are formed. The outer annular passage contains a mass of desiccating agent and receives atmospheric air through a perforated metal filter in the outer tube. The air leaves the mass of desiccating agent through a porous metal filter carried by the intermediate tube and into the inner annular passage. From said inner annular passage, the dried and filtered air flows into the center passage which is heated by an electric heating unit extended into said center passage at the point of entry of the air into said center passage. The absolutely dried and filtered air passes from the center passage through a center outlet formed by the retaining nut.

Figure 2:
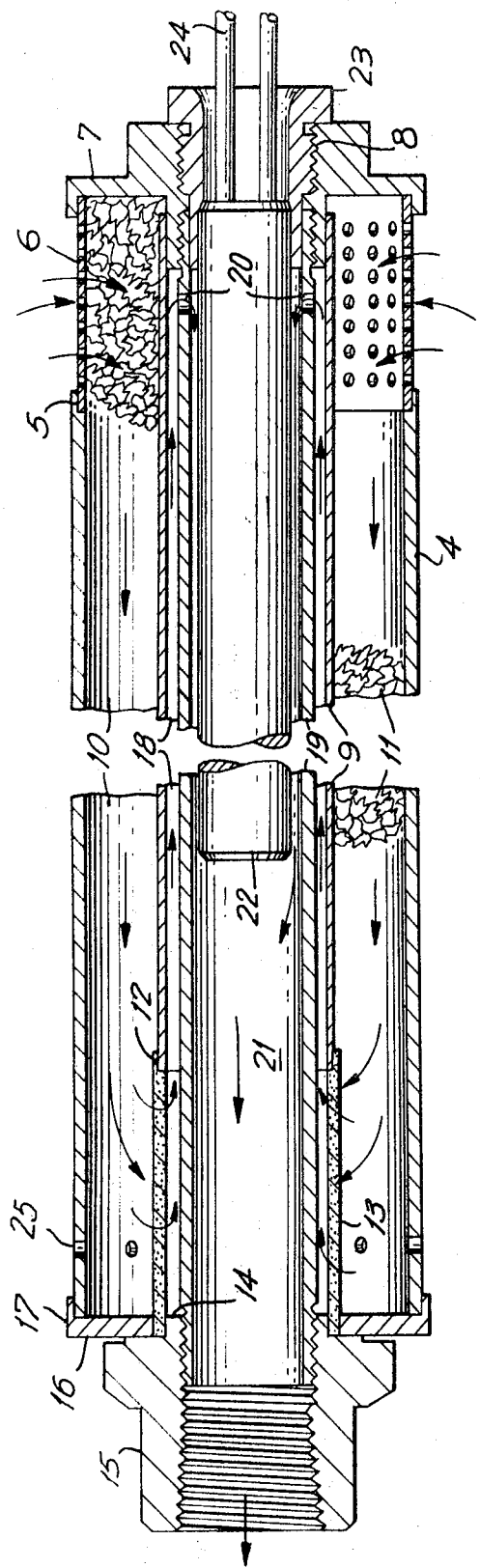
FIG. 2 is a sectional view of the air drier and filter taken on the line 2–2 of FIG. 1 looking in the direction of the arrows.
Figure 3:
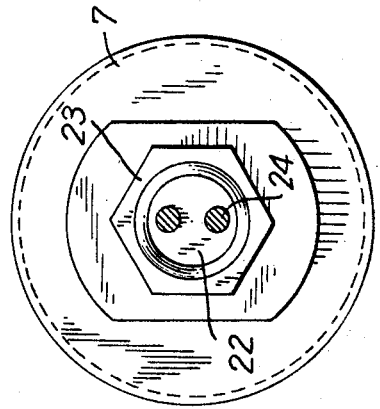
FIG. 3 is another end view of the air drier and filter looking at the inlet end.
Figure 1:
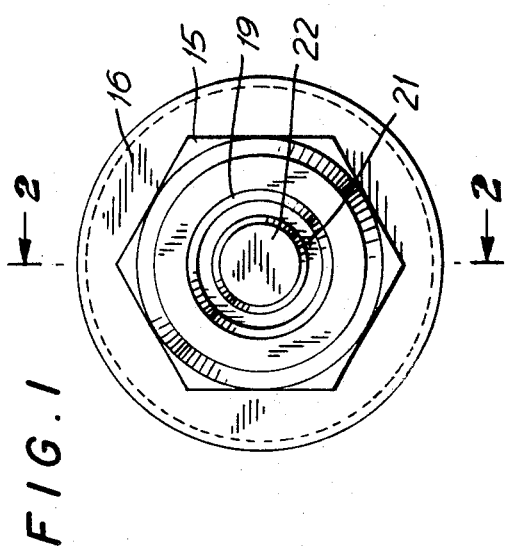
FIG. 1 is an end view of the air drier and filter looking at the outlet end.

The embodiment of the invention comprises a casing in the form of a tube 4 having one end edge provided with an annular recess 5 for the reception of an annular perforated metal filter 6 engaged by an annular cap member 7 having a screw-threaded tubular bore 8 for mounting a baffle tube 9 on the outer circumference of the tubular bore 8 to form with the casing tube 4 an annular passage 10 for the flow of atmospheric air entering the perforated metal filter 6 longitudinally through a mass of a desiccating agent, such as silica gel, as indicated at 11 in FIG. 2. The end of the baffle tube 9 opposite the end mounted on the tubular bore 8 is engaged in an annular recess 12 in an end of a tubular porous metal filter 13 having the opposite end engaged on an annular flange 14 of a locknut 15. The porous metal filter 13 is secured to the flange 14 by a washer 16 having a flange 17 engaged on the outer circumference of the casing tube 4. The porous metal filter 13 is used to remove all dust and foreign substances from the air.

The air flows from the passage 10 through the porous metal filter 13 into a narrow annular passage 18 formed between the baffle tube 9 and an outlet tube 19 having the opposite end portions screw threaded in the tubular bore 8 and the locknut 15.

The air flows from the annular passage 18 through an annular row of equidistantly spaced openings 20 in the outlet tube 19 into a center passage 21 formed by the bore of said outlet tube and through the locknut 15 into a conduit, not shown, which is screw threaded in said locknut and connected to the suction or intake side of a compressor.

During the travel of the air in the passages 18 and 21, said air is heated by an electric heating unit 22 carried by a nut 23 having external screw threads engaging the screw threads of the tubular bore 8. Electric conductors 24 of the electric heating unit are extended through the nut 23 to a source of electricity.

When the drier and filter is regenerated with heat, the moisture in the form of steam is expelled from the casing tube 4 through an annular row of equidistantly spaced openings 25 in said casing tube adjacent the washer 16 and of a size materially smaller than the filters 6 and 13.

The drier and filter is particularly adapted to be used with a water purifier using ozone as a purifying agent. In using ozone effectively for this purpose, the air which is mixed with the ozone must be absolutely dry.

I claim:

1. An air drier and filter comprising a cylindrical casing having an air inlet in the sidewall and at a first end of the casing, a filter in the air inlet, a first annular passage extending from the air inlet to the second end of the casing and arranged with an outlet at said second end of the casing, a desiccating agent filling said first annular passage, a second annular passage extending from said second end to the first end of the casing with the outlet of the first annular passage opening to said second annular passage, a filter in the outlet of the first annular passage, a center passage communicating with the second annular passage at the first end of the casing and having an outlet at the second end of the casing, an electric heating unit mounted in the center passage in spaced relation to the wall of said center passage, and the walls of the passages being imperforated.

2. An air drier and filter as claimed in claim 1, wherein the filter in the casing inlet is of perforated metal.

3. An air drier and filter as claimed in claim 1, wherein the filter in the outlet of the first annular passage is of porous metal.

4. An air drier and filter as claimed in claim 1, wherein communication between the second annular passage and the center passage comprises an annular row of spaced openings.

5. An air drier and filter as claimed in claim 1, wherein the electric-heating unit is supported at one end in the first end of the casing and the opposite end of the electric-heating unit is spaced from the outlet of the center passage.

6. An air drier and filter as claimed in claim 1 wherein the casing is provided with an annular row of openings materially smaller than the air inlet and the first passage outlet and adjacent the second end of the casing for expelling moisture in the form of steam from the casing when the drier and filter is regenerated with heat.